United States Patent [19]

Steiner et al.

[11] 4,086,223
[45] Apr. 25, 1978

[54] ASYMMETRICAL 1:2-CHROMIUM COMPLEX AZO DYESTUFFS

[75] Inventors: Eginhard Steiner, Allschwil near Basel; Fabio Beffa, Riehen near Basel, both of Switzerland

[73] Assignee: Ciba-Geigy AG, Switzerland

[21] Appl. No.: 767,131

[22] Filed: Feb. 9, 1977

Related U.S. Application Data

[63] Continuation of Ser. No. 660,402, Feb. 23, 1976, abandoned, which is a continuation of Ser. No. 584,891, Jun. 9, 1975, abandoned, which is a continuation of Ser. No. 496,283, Aug. 8, 1974, abandoned, which is a continuation of Ser. No. 885,296, Dec. 15, 1969, abandoned.

[30] Foreign Application Priority Data

Dec. 23, 1968 Switzerland .................... 19148/68

[51] Int. Cl.² ............... C09B 45/16; C09B 45/26; C09B 62/08; C09B 62/24
[52] U.S. Cl. ............................. 260/151; 106/23; 260/146 R; 260/146 D; 260/146 T; 260/147; 260/148; 260/149; 260/150; 260/196; 260/299
[58] Field of Search ............... 260/148, 149, 150, 151, 260/146 R, 147, 299, 146 D, 146 T

[56] References Cited

U.S. PATENT DOCUMENTS 3,169,123 2/1965 Neier ............... 260/145 A

*Primary Examiner*—Floyd D. Higel
*Attorney, Agent, or Firm*—Wenderoth, Lind & Ponack

[57] ABSTRACT

Asymmetrical 1:2-chromium complex dyestuffs having excellent fastness to light, rubbing, washing, alkali, milling sea water, decatizing and perspiration and having the formula

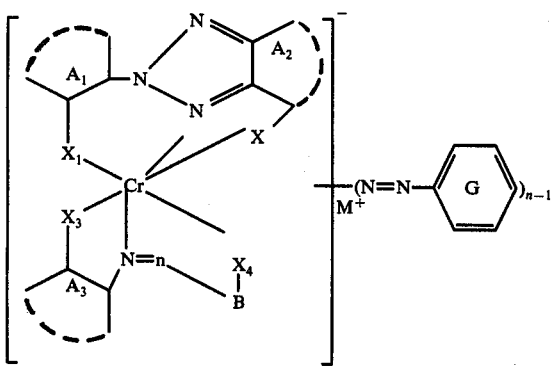

wherein
$A_1$ represents o-phenylene unsubstituted or substituted by halogen, nitro, lower alkyl, lower alkylsulphonyl, phenylsulphonyl, —$SO_3^-M^+$ or

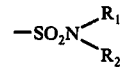

wherein $R_1$ represents hydrogen, lower alkyl and $R_2$ represents hydrogen, lower alkyl or phenyl, or by a cellulosic fiber-reactive group, or o-naphthylene unsubstituted or substituted by —$SO_3^-M^+$,
$A_2$ represents unsubstituted o-phenylene or o-naphthylene unsubstituted or substituted by hydroxyl or —$SO_3^-M^+$, and
$A_3$ represents o-phenylene unsubstituted or substituted by halogen, nitro, lower alkyl, lower alkoxy, lower alkylsulphonyl, phenylsulphonyl, —$SO_3^-M^+$—or

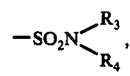

wherein $R_3$ and $R_4$ independently of each other represent hydrogen or lower alkyl, or o-naphthylene unsubstituted or substituted by nitro, —$SO_3^-M^+$ or both
B represents 1,2-naphthylene unsubstituted or substituted by halogen, phenylamino, —$COO^-M^+$, —$SO_3^-M^+$, N-lower-alkyl-sulphamoyl or N,N-di-lower-alkylsulphamoyl; 4-(1-phenyl-3-methyl-pyrazol-5-onyl), 4-(halogenphenyl-, 1-lower-alkyl-sulphonylphenyl- or 1-$SO_3^-M^+$-phenyl-3-methyl-pyrazol-5-onyl) or 4-(1-$SO_3^-M^+$-phenyl-3-methyl-5-amino-pyrazolyl),
$M^+$ represents a colorless cation, and
n represents an integer from 1 to 3,
and wherein ring G is unsubstituted or substituted by halogen, —$SO_3^-M^+$- or sulphamoyl,
$X_1$ represents —O—,
$X_2$ represents —O— or —COO—,
$X_3$ represents —O—, —COO— or

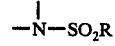

wherein R denotes lower alkyl or phenyl
$X_4$ represents —O—, —NH— or

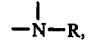

wherein R has the meaning given in the definition of $X_3$, and

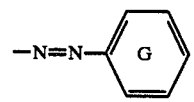

being linked to $A_1$, $A_3$ or both and the dyestuff molecule having, in all, from 0 to 3 —$SO_3^-M^+$ groups, and
wherein more than one

ASYMMETRICAL 1:2-CHROMIUM COMPLEX AZO DYESTUFFS

This is a continuation, of application Ser. No. 660,402, filed Feb. 23, 1976, which in turn is a continuation of Ser. No. 584,891, filed June 9, 1975 which in turn is a continuation of Ser. No. 496,283, filed Aug. 8, 1974 which in turn is a continuation of Ser. No. 885,296, filed Dec. 15, 1969, all now abandoned.

DETAILED DISCLOSURE

The present invention relates to new chromium-containing complex dyestuffs, to processes for the production of these dyestuffs, to their use for the dyeing and printing of organic materials, especially textile material and, as an industrial product, to the organic material which is dyed or printed using these dyestuffs.

On account of their good dyeing properties, combined with excellent fastness to light, heavy-metal-containing complex dyestuffs have assumed increasing importance. Of particular value are metallised azo dyestuffs containing on 1 atom of coordinatively hexavalent heavy metal two molecules of azo dyestuff; said dyestuffs, however, all exhibit more or less covered shades. An extension of the color spectrum with 1:2-metal-complex dyestuffs to purer shades, particularly to the much sought green shades, has not been possible hitherto.

It has now been found that chromium-containing complex dyestuffs of Formula I,

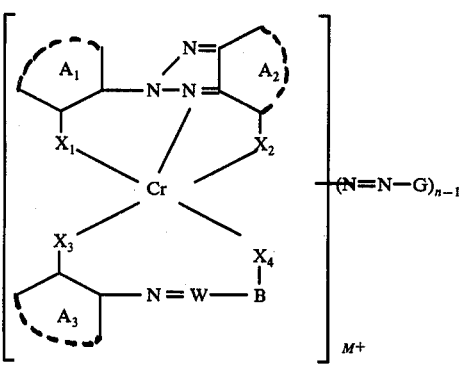

(I)

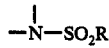

wherein $A_1$, $A_2$, $A_3$ and G each complete or represent an, at most, binuclear aryl radical, B represents the radical of a coupling component, coupled in a position adjacent $X_4$, or the radical of an o-hydroxybenzaldehyde or o-hydroxynaphthaldehyde, $M^+$ represents the colorless cation, such as the sodium, potassium or ammonium ion, W represents the bridging member =N— or =CH—, $X_1$ represents —O—, $X_2$ represents —O— or —COO—, $X_3$ represents —O—, —COO— or

and, if W represents the methine group, also —N—R, wherein R denotes a lower alkyl radical or an optionally substituted phenyl radical, $X_4$ represents —O— and, if W denotes the bridging member =N—, $X_4$ also represents —NH— or

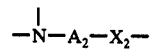

wherein R has the meaning given under $X_3$, and n represents an integer from 1 to 4, and wherein the radicals $A_1$, $A_2$, $A_3$, B and G can be further substituted by substituents common in azo dyestuffs, $$-\overset{|}{N}-A_2-X_2-$$

forms together with Cr a 6-membered ring and G—N=N— is bound to $A_1$, $A_3$ or B, possess good fastness properties and that, in particular, 1:2-chromium complex dyestuffs according to the invention, obtained from metallisable triazole dyestuffs and o-hydroxy-o'-aminoazo dyestuffs possess pure and brilliant green shades, which were hitherto unattainable with 1:2-heavy metal complex dyestuffs. Moreover, it is surprising that these chromium complex dyestuffs, according to the invention, are stable since, as is known, symmetrical or asymmetrical 1:2-chromium complex dyestuffs from metallisable azo dyestuffs and o-hydroxy-o'-aminoazo dyestuffs are unstable.

Suitable as aryl radicals which are completed or represented by $A_1$, $A_2$, $A_3$ and G are, in particular, radicals of the benzene series for $A_1$, $A_3$ and G, and radicals of the naphthalene series for $A_2$.

As the radical of a coupling component, coupled in a position adjacent $X_4$, B represents, e.g. a hydroxybenzene, hydroxynaphthalene or preferably an aminonaphthalene radical, the radical of an enolic coupling component of the hetero series, e.g. a 1-aryl-5-aminopyrazole radical or 1-aryl-5-pyrazol-5-one radical.

If $X_3$ or $X_4$ represents the

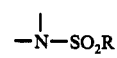

group or the

group, then R, as a lower alkyl radical, represents, e.g. the methyl or ethyl group or, as an optionally substituted phenyl radical, R represents, e.g. the chloro-, methyl- or methoxyphenyl group.

The —N=N—G group represents, in particular, an unsubstituted phenylazo radical or a phenylazo radical substituted by a sulphonic acid group, a sulphamoyl group or a chlorine atom.

If dyestuffs according to the invention contain more than one arylazo group —N=N—G, these groups are not bound to the same aryl radical and the aromatic radicals G can be identical or different. If $A_1$, $A_3$ or B represent a radical of the benzene series which contains the —N=N—G group, then the —N=N—G group is bound to the respective radical, preferably in p-position to the substituent participating in the chromium complex formation.

In addition to the essential substituents $X_1$, $X_2$, $X_3$ and $X_4$ and optionally —N=N—G, the aromatic radicals $A_1$, $A_2$, $A_3$, B, and also G, can contain further ring substituents common in dyestuffs, e.g. halogens, such as fluorine, chlorine or bromine; cyano or nitro groups; hydrocarbon groups, especially lower alkyl groups such as methyl, ethyl, isopropyl, tert.butyl; substituted lower alkyl groups, e.g. perfluoroalkyl groups such as trifluoromethyl, also hydroxyalkyl groups such as hydroxyethyl or γ-hydroxypropyl; ether groups, preferably lower alkoxy groups, but also aryloxy groups such as methoxy, ethoxy, butoxy, phenoxy, methylphenoxy; thioether groups, e.g. lower alkylthio and phenylthio groups such as methylthio, ethylthio, phenylthio; acyl groups such as lower alkanoyl, aroyl, lower alkylsulphonyl or arylsulphonyl groups; arylsulphonyloxy groups such as phenylsulphonyloxy groups; primary, secondary or tertiary amino groups; acylamino groups, particularly lower alkanoylamino groups such as acetylamino; lower alkoxycarbonylamino groups such as ethoxycarbonylamino, or aroylamino groups such as benzoylamino groups; lower alkylsulphonylamino groups or arylsulphonylamino groups; carbamoyl groups and sulphamoyl groups, optionally mono- or di-substituted on the nitrogen atom, especially N-lower alkyl- or N,N-di-lower alkylsulphamoyl groups, also groups dissociating acid in water such as, e.g. the carboxylic acid, sulphonic acid, and phosphonic acid group or acylated sulphonic acid amide groups. The aromatic rings possibly present in these substituents can also be substituted in a like manner.

Here and in the following, the expression "lower" in connection with alkyl, alkoxy or alkanoyl radicals, denotes such groupings having at most 4 and preferably 1 or 2 and 2 or 3 carbon atoms, respectively.

Furthermore, the complex dyestuffs according to the invention can also contain in the radicals $A_1$, $A_2$, $A_3$, B and G groupings known as fiber-reactive groupings, i.e. groups which can form a chemical covalent bond with the fiber. These reactive groups can be bound to the stated aromatic rings either directly, or by way of bridging members such as, oxygen, sulphur, an imino, a methyleneimino, carbonylimino, sulphonylimino or ureylene group, whereby the imino hydrogen can be substituted by a methyl group. Preferably, these groups consist of reactive derivatives of acids containing in the acid radical at least one substituent which can be split off as anion, preferably a labile halogen atom and/or a multiple bond capable of addition, or of cyclic imide halides of carbonic acid preferably having several substituents which can be split off as anion.

Radicals of an acid containing at least one labile halogen atom and/or a multiple bond capable of addition are, e.g. the radical of chloroacetic or bromoacetic acid, β-chloro- or β-bromo-propionic acid, α,β-dibromopropionic acid, tetrahalogencyclobutane carboxylic acid, propiolic acid, acrylic acid, methacrylic acid, α-chloro-, β-chloro-, α-bromo- and β-bromoacrylic acid, α,β- and β,β-dichloro- or -dibromoacrylic acid, trichloro- or tribromoacrylic acid, 2-(2,2,3,3-tetrafluorocyclobutyl-1)-acrylic acid, crotonic acid, α- or β-chloro- or -bromocrotonic acid, α,β-dichloro- or -dibromocrotonic acid, maleic acid, monochloro- and monobromomaleic acid, dichloro- and dibromomaleic acid, fumaric acid, monochloro- and monobromofumaric acid, dichloro- and dibromofumaric acid, fumaric acid monoester, dichloro- and dibromosuccinic acid, vinylsulphonic acid, β-chlorovinylsulphonic acid or a nitrohalogenbenzoic acid or nitrohalogenbenzene sulphonic acid with a labile halogen atom.

Preferably, the reactive group consists of the radical of an aromatic nitrogen heterocycle having advantageously more than one ring hetero atom and which contains at least one labile halogen atom such as fluorine, chlorine or bromine, or an acryloyl, N-hydroxymethyleneamino, sulphonic acid or alkylsulphonyl group on a ring carbon atom. Examples thereof are: the triazinyl or diazinyl radical having at least one labile halogen atom, e.g. the radical of cyanuric chloride, cyanuric bromide or their primary condensation products with ammonia, amines, alkanols, alkylmercaptans, phenols or thiophenols, or the radical of tri- or tetrahalogenpyrimidines such as the 2,4-dichloro-, 2,4,5-trichloro-, -bromo-, -fluoro-, 5-bromo- or 5-chloro-2,4-difluoro- or 5-bromo-2,4-dichloropyrimidyl-6 radical, or the radical of the 2,4-dichloro-, 2,4-dibromo- or 2,4-difluoropyrimidine-5- or -6-carboxylic acid; the 2,3-dihalogenquinoxaline-carboxylic acid or -sulphonic acid or the 2-halogen-benzothiazole-5- or -6-carboxylic acid.

Examples of further fiber-reactive groupings which can be contained in complex dyestuffs, according to the invention, are β-hydroxyalkyl, -sulphonyl, -sulphonamido or -carbonamido groups, esterified with strong acids, such as the β-halogenethylsulphonyl, β-sulphatoethylsulphonyl, β-sulphatoethyl-sulphonamido, β-sulphatoethyl-N-methylsulphonamido- or β-sulphato-propionamido group, the β-alkyl- or β-phenylsulphonylalkyl-sulphonyl, -sulphonamido or -carbonamido group.

Advantageously, complex dyestuffs of Formula I, according to the invention, contain 1 or 2 such fiber-reactive groupsings. If groupings. dyestuff contains two such groupings, then these are not on the same aryl radical. Complex dyestuffs are preferred which have one fiber-reactive grouping bound to the radical $A_1$.

The chromium-containing complex dyestuffs of Formula I, according to the invention, can be produced by the usual methods, e.g. by reacting, in any chosen sequence, a triazole dyestuff of Formula II

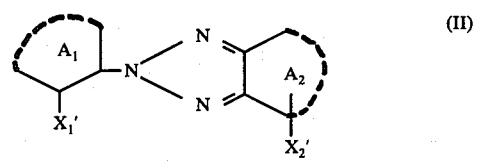

and an azo or azomethine dyestuff of Formula III,

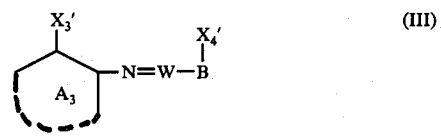

wherein $X_1'$ represents the hydroxyl group, a lower alkoxy group or an acyloxy group, $X_2'$ represents the hydroxyl group or the carboxyl group, $X_3'$ represents, if W denotes the methine group, the hydroxyl, carboxyl, —NH—R— or —NH—SO$_2$R— group, wherein R has the meaning given under $X_3$, and if W denotes the bridging member =N—, $X_3'$ represents the hydroxyl, carboxyl, a lower alkoxy, a carbalkoxy, an

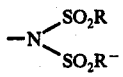

wherein R has the above given meaning, or an acyloxy group, and $X_4'$ represents the hydroxyl group and, if W denotes the bridging member =N—, $X_4'$ also represents the —$NH_2$— or —NH—R— group, wherein R has the meaning given and $X_3'$, and wherein the radicals $A_1$, $A_3$ and B together have optionally at most three G—N=N— groups as substituents, and wherein for $A_1$, $A_2$, $A_3$, B, G and

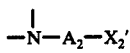

the data apply which are given for the corresponding symbols and for

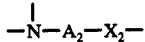

under Formula I, with a chromium releasing agent to produce a chromium-containing complex dyestuff of Formula I, and optionally reacting acylatable amino groups, which are present, with reactive derivatives of acids which contain in the acid radical at least one substituent, which can be split off as an anion, and/or a multiple bond capable of addition, or with cyclic imide halides of carbonic acid, which have several substituents which can be split off as anion, to give the corresponding reactive dyestuff.

As a lower alkoxy or carbalkoxy group, $X_3'$ represents, in particular, the methoxy, ethoxy, carbomethoxy or carbethoxy group, while for $X_3'$ and $X_4'$ as an —NH—R—, —NH—$SO_2$R— or

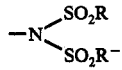

group, the data apply, with regard to R, which are given under $X_3$ and $X_4$.

The triazole compounds of Formula II, usable according to the invention, are known per se and can be produced by known methods, e.g. by oxidizing o-aminoazo dyestuffs of Formula IV,

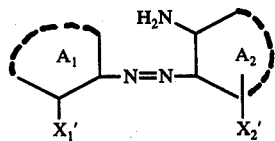

wherein for $A_1$, $A_2$, $X_1'$ and $X_2'$ the meanings given under Formulae I and II, respectively, apply with oxidation agents such as hydrogen superoxide, perborate, percarbonate, persulphate, hypochlorite, permanganate, compounds of the hexavalent chromium, cupritetramine sulphate, etc., in the presence or absence of oxidation accelerators such as copper powder, copper ions, iodine, iron salts, triazoles, etc.

Particularly suitable diazo components for the production of o-aminoazo dyestuffs of Formula IV are, e.g. 1-hydroxy- or 1-alkoxy-2-aminobenzenes, unsubstituted or substituted by halogen, nitro, sulphonic acid, lower alkyl or lower alkylsulphonyl groups or by an —N=N—G group. The —N=N—G group can be introduced into the diazo component in a manner known per se.

Suitable as coupling components for the production of o-aminoazo dyestuffs of Formula IV are, e.g. 2-aminonaphthalene-3-carboxylic acid and the corresponding derivatives, which are sulphonated in the non-carboxylated ring, as well as 1-amino-8-hydroxynaphthalene-3,6-disulphonic acid.

Chromable azo dyestuffs of Formula III are, for the most part, known or they can be obtained in a maner known per se, e.g. by coupling the diazonium compound of an arylamine of Formula V,

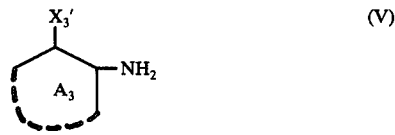

with a coupling component, coupling in a position adjacent $X_4'$, of Formula VI,

wherein for $A_3$, B, $X_3'$ and $X_4'$ the meanings given under Formulae I and III respectively, apply.

Particularly suitable diazotisable arylamines of Formula V are e.g. 1-hydroxy-2-amino-3-, -4- or -5-nitrobenzene, 1-hydroxy-2-amino-4,6-dinitrobenzene, 1-hydroxy-2-amino-4- or -5-chloro- or -5-bromobenzene, 1-hydroxy-2-amino-4-methyl-6-nitrobenzene, 1-hydroxy-2-aminobenzene-4-sulphonic acid, 1-hydroxy-2-amino-4-chlorobenzene-6-sulphonic acid, 1-hydroxy-2-amino-4-methyl-sulphonyl- or -4-ethylsulphonylbenzene, 1-hydroxy-2-amino-4-phenylsulphonylbenzene, 1-hydroxy-2-amino-4-N-methyl- or -N-ethylsulphamoylbenzene, 1-carboxylic acid-2-aminobenzene, 1-carboxylic acid-2-amino-4- or -5-chlorobenzene, 1,4-dimethoxy- or 1,4-diethoxy-2-aminobenzene, 1-methoxy-2-amino-5-nitrobenzene, 1-bis-(phenylsulphonyl)-aminobenzene, 1-bis(4'-chlorophenylsulphonyl)-amino-2-aminobenzene, 1-bis(methylsulphonyl)-amino- or 1-bis-(ethylsulphonyl)-amino-2-aminobenzene, 1-amino-2-hydroxy-naphthalene-4-sulphonic acid, 1-amino-2-hydroxy-6-nitro-naphthalene-4-sulphonic acid, 1-amino-2-methoxy-4-phenylazo-naphthalene-6-sulphonic acid, 1-amino-2-methoxy-4-(4'-chlorophenylazo)-naphthalene-6-sulphonic acid.

Suitable coupling components of Formula VI are, e.g. 2-hydroxynaphthalene, 2-aminonaphthalene or 2-aminonaphthalene-1-sulphonic acid, 2-aminonaphthalene-3-carboxylic acid, 2-aminonaphthalene-5-sulphonic acid amide, -5-sulphonic acid -N-methylamide or -5-sulphonic acid-N-ethylamide, 2-methylamino-, 2-hydroxyethylamino- or 2-ethylaminonaphthalene, 2-phenylaminonaphthalene, 2-(4'-chlorophenylamino)-naphthalene, 2-aminonaphthalene-5- or -6-sulphonic acid, 1-hydroxy-6-phenylaminonaphthalene-3-sulphonic acid, 1-hydroxynaphthalene-3-sulphonic acid, 1-hydroxynaphthalene-3-N,N-dimethylsulphonic acid amide, 1-hydroxy-5,8-dichloronaphthalene, 1-aminonaphthalene-3-, -4- or -5-sulphonic acid, 1-phenyl-3-methyl-5-pyrazolone, 1(3'-chlorophenyl)-3-methyl-5-pyrazolone, 1(3'-sulphonic acid phenyl)-3-methyl-5-pyrazolone, 1-(4'-methylsulphonylphenyl)-3-methyl-5-pyrazolone, 1-(4'-bromophenyl)-3-methyl-5-pyrazolone, 1-phenyl-3-methyl-5-aminopyrazole, 1-hydroxy-3,4-dimethylbenzene, 1-hydroxy-4-cyclohexylbenzene.

Chromable azomethine dyestuffs of Formula III are obtained, e.g by condensation of an arylamine of Formula V with an o-hydroxyarylaldehyde of Formula VII,

wherein for B the meanings given under Formulae I and III, respectively, apply.

Examples of arylamines of Formula V, which are suitable for the production of such azomethine dyestuffs, are listed above of the production of the corresponding azo dyestuffs. Preferred o-hydroxyarylaldehydes of Formula VII are, e.g. the following: 2-hydroxy-benzaldehyde, 2-hydroxy-1-naphthaldehyde, 5-methyl-2-hydroxybenzaldehyde, 3,5-dimethyl-2-hydroxybenzaldehyde, 5-chloro- or 5-bromo-2-hydroxybenzaldehyde, 3,5-dichloro-2-hydroxybenzaldehyde, 3-chloro-5-methyl- or 3-methyl-5-chloro-2-hydroxybenzaldehyde, 5-nitro-2-hydroxybenzaldehyde, 3,5-dinitro- and 5-methoxy-2-hydroxybenzaldehyde and mixtures thereof.

If the radical B in chromable azomethine dyestuffs of Formula III contains an arylazo group —N=N—G, then these azoazomethine dyestuffs, usable according to the invention, are obtained, e.g. by coupling a diazonium compound of an arylamine G-NH$_2$ with o-hydroxyarylaldehydes, which can be coupled, of Formula VII, and condensation of the thereby obtainable arylazoaldehydes with arylamines of Formula V. Such preferred arylazoaldehydes are, e.g. 5-phenylazo-2-hydroxybenzaldehyde, 5-(2'-, 3'- or 4'-chlorophenylazo)-2-hydroxybenzaldehyde, 5-(2'-, 3'- or 4'-nitrophenylazo)-2-hydroxybenzaldehyde, 5-(2'- or 4'-methylphenylazo)-2-hydroxybenzaldehyde, 5-(2'- or 4'-methoxyphenylazo)-2-hydroxybenzaldehyde, 5-(3'-sulphonic acid phenylazo)-2-hydroxybenzaldehyde, 5-(3' or 4'-sulphamoylphenylazo)-2-hydroxybenzaldehyde.

If the radical A$_3$ in chromable azo- or azomethine dyestuffs of Formula III contains an arylazo group —N=N—G, then these starting materials are obtained, e.g. by coupling the diazonium compound of an aromatic amine G—NH$_2$ with an N-acylated 2-amino-1-hydroxybenzene and, after saponification of the acylamino roup, diazotising the obtained aminoazo compound and coupling it with a coupling component of Formula VI or condensing it with an o-hydroxyarylaldehyde.

Azo-azomethine dyestuffs of Formula III, usable according to the invention, having a G—N=N— group in each of the radicals A$_3$ and B, can be obtained, e.g. by condensation of the above stated arylazo-o-hydroxyaryl-aldehydes with arylazoarylamine compounds of the above mentioned type.

Preferably used, as chromium releasing agents, are the simple salts of the trivalent chromium such as chromic fluoride, chromic chloride, chromic sulphate, chromic acetate, chromic formiate, potassium chromic sulphate or ammonium chromic sulphate, optionally in the presence of such compounds which in alkaline medium, are able to form soluble complex compounds with the chromium salts, e.g. tartaric, citric, lactic or salicyclic acid.

The chroming is carried out using methods known per se, e.g. by allowing somewhat more than the equimolecular amount of one of the above-mentioned chromium-releasing compounds to act on a mixture of equimolecular amounts of the metal-free dyestuffs of Formulae II and III in aqueous or aqueous-organic solution or suspension, or in an orgaic solvent, advantageously at temperatures of 90° to 150° C and in neutral to alkaline medium.

The reaction with chromium-releasing agents is, however, advantageously carried out in stages. A triazole dyestuff of Formula II, preferably, however, an azo dyestuff of Formula III, is thus reacted with equimolecular amounts or with an excess of a chromium-releasing agent to give a complex chromium compound, which contains 1 molecule of dyestuff bound per chromium atom. This is advantageously performed at temperatures of 90° to 150° C, optionally under pressure, in aqueous, aqueous-organic or organic solution or suspension, and preferably in acid medium, e.g. in the presence of lower fatty acids such as, e.g. formic acid or acetic acid, or in the presence of mineral acids such as, e.g. hydrochloric acid or sulphuric acid. The addition of the metal-free dyestuffs of Formula II or III to the 1:1-chromium complex compound to give the chromium complex dyestuff of Formula I, is performed, e.g. in weakly acid, neutral or advantageously in alkaline medium at slightly elevated temperature, e.g. at 40° to 90° C. The operation is performed advantageously in aqueous or organic, e.g. alcoholic medium, and preferably in the presence of mineral-acid-buffering agents or alkaline agents, such as sodium acetate, sodium carbonate, sodium hydroxide or the corresponding potassium or ammonium compounds. The addition occurs, in most cases, rapidly and completely. Since this addition process renders possible the production of uniform and particularly pure 1:2-chromium complex dyestuffs, according to the invention, it constitutes the preferred production process.

The so-called 1:1-chromium complex of a metallised dyestuff, used for the addition of the metal-free dyestuffs, can contain on the chromium atom, depending on the method of production and on the reaction medium, further ligands. Suitable in this respect are, e.g. aquo, acido or hydroxo complexes of the chromium-containing dyestuff. The 1:1-chromium complex can also contain chelated ligands which can be displaced by the second dyestuff being dicyclically added, such as is the case, e.g. with respect to the salicylato or tartrato compounds of metal-containing dyestuffs having one chromium atom per dyestuff molecule.

Finally, instead of an azomethine dyestuff of Formula III, it is also possible, in many cases, to use components thereof, i.e. the corresponding amounts of an o-hydroxyarylamine and of an o-hydroxyarylaldehyde.

Suitable solvents are, e.g. amides of lower fatty acids such as formamide, acetamide or dimethylformamide, alcohols such as alkanols or alkylene glycols, e.g. ethylene glycol, ethylene glycol monomethyl or -ethyl ether, as well as mixtures thereof.

If, for example, the starting material is an o-alkoxy-o'-carboxytriazole or an o-alkoxy-o'-hydroxyazo dyestuff, then chroming has to be performed under conditions, e.g. at temperatures of 120° – 140° C, which ensure that a splitting off of the alkyl group from the o-alkoxy-o'-carboxytriazole or o-alkoxy-o'-hydroxyazo compound occurs. In this case, it is preferable to operate in organic solvents, e.g. in formamide, dimethylformamide or diethylene glycol, at 120 to 160° C.

On the other hand, if, for example, azo or azomethine dyestuffs of Formula III are used, wherein $X_3'$ represents an acyloxy, a carbalkoxy or an

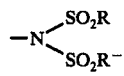

group, wherein R denotes a lower alkyl radical or an optionally substituted phenyl radical, then these groups have to be saponified, advantageously before chroming, preferably in alkaline medium at temperatures of about 30° to 120° C, to hydroxyl or carboxyl groups and monoalkylsulphonylamino or monophenylsulphonylamino groups, respectively.

Reactive dyestuffs according to the invention are obtained, e.g. by using the above mentioned starting components with reactive substituents, or by subsequent reaction of dyestuffs containing acylatable amino groups, in the usual manner, advantageously in aqueous medium, optionally in the presence of inert, easily-removable organic solvents such as lower aliphatic ketones, e.g. acetone, and preferably in the presence of mineral-acid-buffering agents such as sodium or potassium carbonate, sodium or potassium hydroxide, di- or tri-sodium phosphate, sodium or potassium acetate or tertiary nitrogen bases such as pyridine. Advantageously, in this case, the halides, especially chlorides, or the anhydrides of the carboxylic acids and sulphonic acids mentioned in the discussion of the fibre-reactive groups, or halogendiazines and -triazins containing more than one labile halogen atom, are used.

The new chromium-containing complex dyestuffs can be obtained from aqueous or aqueous-organic solutions by salting out, and from organic solutions by precipitation with water or alkali metal chloride solution, such as sodium or potassium chloride solution, or ammonium chloride solution, or by distilling off the organic solvent. The new dyestuffs can also be directly isolated by the spray-drying method.

The chromium-containing complex dyestuffs, according to the invention, are suitable for the dyeing of very diverse organic materials. The water-insoluble complex dyestuffs are used, in particular, for the dyeing of synthetic materials of all kinds, such as lacquers, varnishes or spinning solutions from acetyl cellulose, synthetic polyamides or polyesters. Alcohol-soluble dye salts can be produced, e.g. by precipitating chromium-containing complex dyestuffs containing no water-solubilising groups, according to the invention, with organic amines, advantageously with dehydroabietylamine, di- or tetrahydroabietylamine.

Chromium complex dyestuffs according to the invention containing salt-forming groups which dissociate acid in water, such as sulphonic acid groups, are principally textile dyestuffs and are particularly suitable for the dyeing and printing of wool, silk, synthetic polyamide fibres or polyurethane fibres and also for the dyeing and printing of leather and paper.

Complex dyestuffs, according to the invention, which contain, except for groups optionally participating in the complex formation, no salt-forming groups dissociating acid in water, e.g. no carboxylic acid and sulphonic acid groups, but contain only substituents which promote the water solubility, e.g. lower alkylsulphonyl, unsubstituted sulphamoyl groups or sulphamoyl groups substituted by lower alkyl radicals, as well as carboxylic acid-di-lower-alkylamide groups, have a very good affinity to wool and to material which, with regard to dyeing, behaves in a similar manner, e.g. synthetic polyamide material, and they completely draw on to these materials already from a neutral to weakly acid bath. Optionally, the water solubility of such dyestuffs can be increased further by the addition of anion-active or non-ionogenic wetting or dispersing agents, or diluting agents.

When they contain fiber-reactive groupings, the complex dyestuffs, according to the invention, can also be used for the dyeing of cellulose material such as spun rayon, jute, ramie, hemp and particularly cotton. In order to obtain adequate solubility, the dyestuffs in this case should advantageously contain in the molecule, at least two water-solubilising groups dissociating acid in water, such as sulphonic acid or carboxylic acid groups.

The dyeings produced with the complex dyestuffs, according to the invention, are yellow, orange, red, currant shade, brown, green, olive, greyish green, blueish green, blue and grey, the green dyeings being characterised by, for complex dyestuffs, particularly pure and brilliant shades. Dyeings produced on wool or on synthetic polyamide using complex dyestuffs, according to the invention, are especially characterised by a good fastness to light and rubbing and excellent fastness to wet processing, e.g. good fastness to washing, alkali, milling, sea water and decatising and perspiration. Furthermore, the dyeings are very even.

Preferred chromium-containing complex dyestuffs, according to the invention, correspond to Formula VIII,

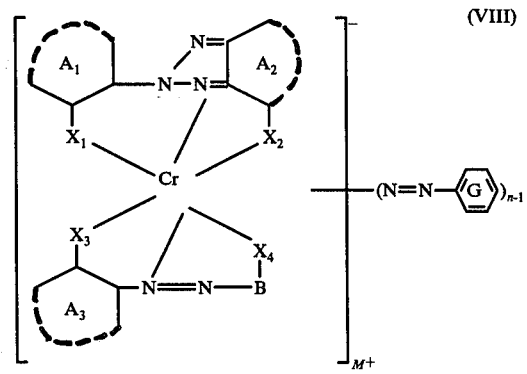

wherein $A_1$ completes an o-phenylene radical unsubstituted or substituted by halogen, nitro, lower alkyl, lower-alkylsulphonyl, phenyl-sulphonyl, $-SO_3^-M^+$- or

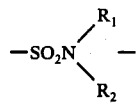

groups wherein $R_1$ represents hydrogen, a lower alkyl group and $R_2$ represents hydrogen, a lower alkyl group or the phenyl group, or by a fibre-reacting grouping, or an o-naphthylene radical unsubstituted or substituted by an -$SO_3^-M^+$-group, $A_2$ completes an unsubstituted o-phenylene radical or an o-naphthylene radical unsubstituted or substituted by a hydroxyl or -$SO_3^-M^+$-group, and $A_3$ completes an o-phenylene radical unsubstituted or substituted by halogen, nitro, lower alkyl, lower alkoxy, lower alkylsulphonyl, phenylsulphonyl, -$SO_3^-M^+$- or

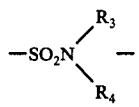

groups, wherein $R_3$ and $R_4$ independently of each other represent hydrogen or a lower alkyl group, or an o-naphthylene radical unsubstituted or substituted by a nitro and/or an -$SO_3^-M^+$-group, B represents a 1,2-naphthylene radical unsubstituted or substituted by halogen, phenylamino, -$COO^-M^+$-, -$SO_3^-M^+$-, N-lower-alkylsulphamoyl or N,N-di-lower-alkylsulphamoyl groups; the 4-(1-phenyl-3-methyl-pyrazol-5-onyl) radical, a 4-(halogenphenyl-, 1-lower-alkylsulphonylphenyl- or 1-$SO_3^-M^+$-phenyl-3-methyl-pyrazol-5-onyl) radical or a 4-(1-$SO_3^-M^+$-phenyl-3-methyl-5-amino-pyrazolyl) radical, $M^+$ represents the equivalent of the colourless cation, and $n$ represents an integer from 1 to 3, and wherein G can be substituted by halogen, an —$SO_3^-M^+$— or a sulphamoyl group and $X_1$, $X_2$, $X_3$ and $X_4$ have the meanings given under Formula I, the group

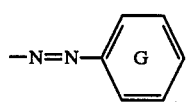

being linked to $A_1$ and/or $A_3$ and the dyestuff molecule having, in all, from 0 to 3 -$SO_3^-M^+$-groups.

On account of the particularly pure and brilliant green fast dyeings attainable by them, chromium complex dyestuffs of Formula IX

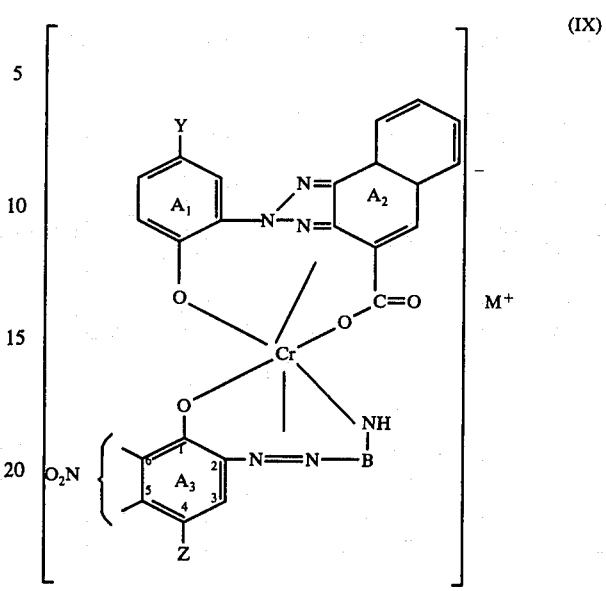

are preferred, wherein

Y represents hydrogen, halogen, the nitro, a lower alkylsulphonyl, phenylsulphonyl, -$SO_3^-M^+$-,

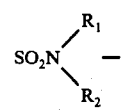

groups wherein $R_1$ represents hydrogen or a lower alkyl group and $R_2$ represents hydrogen, a lower alkyl group or the phenyl group, or the

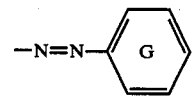

group,

Z represents chlorine, a nitro, lower alkyl, lower-alkylsulphonyl or -$SO_3^-M^+$-group, and, when $A_3$ is unsubstituted in 6-position, also hydrogen, B represents a 1,2-naphthylene radical, and $M^+$ represents the equivalent of a colourless cation, whereby $A_2$ and/or B can be substituted by an -$SO_3^-M^+$-group and the dyestuff molecule contains, in all, from 0 to 2 -$SO_3^-M^+$-groups.

Further details are given in the following examples. In these examples, the temperatures are stated in degrees centigrade.

EXAMPLE 1

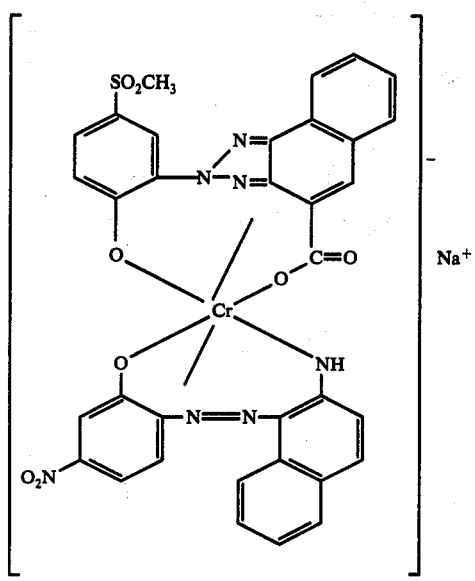

42.7 g of the disodium salt of the triazole dyestuff, obtained by oxidation of the monoazo dyestuff: 2-aminophenol-4-methylsulphone → 2-amino-3-naphthoic acid, are suspended in 1500 ml of ethylene glycol monomethyl ether at 80°. To this suspension are added 40 g of sodium bicarbonate and 35.7 g of the 1:1-chromium complex compound, corresponding to 5.2 g of chromium and 30.7 g of the monoazo dyestuff: 5-nitro-2-aminophenol → 2-naphthylamine-1-sulphonic acid.

The obtained mixture is thereupon heated for one hour to 85°, whereby a dark green solution is obtained. After cooling of the solution to room temperature, it is poured, while being stirred, on to 2000 ml of 20% sodium chloride solution, the precipitated dyestuff is filtered off and dried. The formed dyestuff corresponds to the above formula. It is in the form of a dark green powder which dyes wool and synthetic polyamide fibres, from a neutral to weakly acid bath, in pure green shades. The dyeings obtained therewith are even and have good fastness to light and to wet processing.

EXAMPLE 2

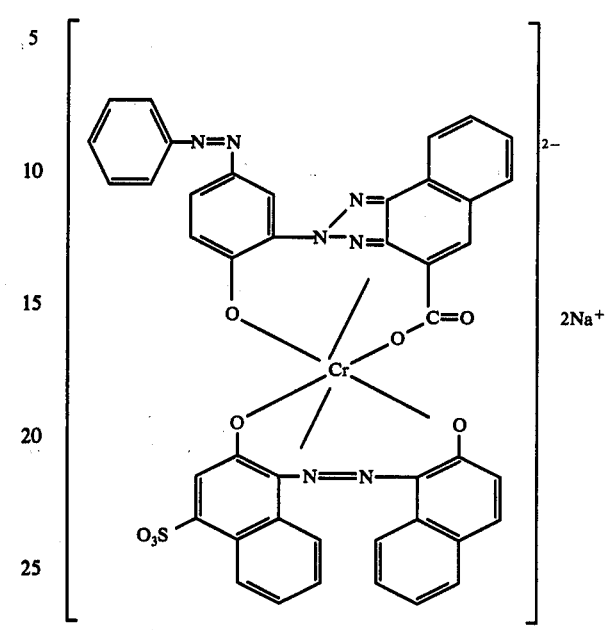

40.9 g of the phenylazotriazole dyestuff, obtained by alkaline coupling of 9.3 g of diazotised aniline with 30.5 g of 2-N-(2′-hydroxyphenyl)-3-carboxynaphthotriazole-[1,2], are dissolved in 500 ml of dimethylsulphoxide at 80°. To this solution are added 44.4 g of the 1:1-chromium complex compound, corresponding to 5.2 g of chromium and 39.3 g of the monoazo dyestuff: 1-amino-2-hydroxynaphthalene-4-sulphonic acid → β-naphthol, and 40 g of sodium acetate.

The dark-olive solution is heated for one hour to 80°. The formed dyestuff is then precipitated by pouring the solution into 2000 ml of 10% sodium chloride solution containing 50 g of sodium carbonate. The precipitated dyestuff is filtered off and dried. It corresponds to the above formula and is in the form of a dark powder, which dyes wool, from a neutral to acetic bath, in greenish-olive shades. The obtained dyeings have excellent fastness to wet processing.

EXAMPLE 3

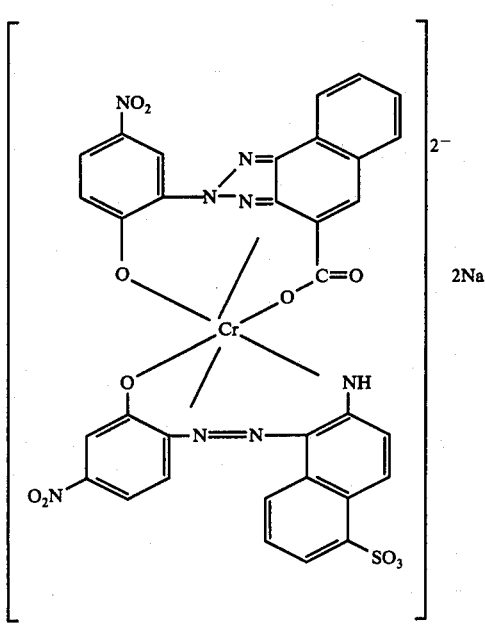

35.0 g of the triazole dyestuff, obtained by oxidation of the monoazo dyestuff: 4-nitro-2-aminophenol → 2-amino-3-naphthoic acid, are dissolved in 500 ml of dimethyl-sulphoxide at 80°. To this solution are added 43.8 g of the 1:1-chromium complex compound, corresponding to 5.2 g of chromium and 38.8 g of the monoazo dyestuff: 5-nitro-2-aminophenol → 2-aminonaphthalene-5-sulphonic acid, and 40 g of sodium acetate.

After the dark green solution has been heated for one hour to 80°, the formed dyestuff is precipitated by pouring the solution on to 2000 ml of 20% sodium chloride solution containing 50 g of sodium carbonate; the dyestuff is then filtered off and dried. The dyestuff corresponds to the above formula and is in the form of a dark powder, which dyes synthetic polyamide fibres, from a neutral to slightly acid bath, in green shades. The obtained dyeings have a very good fastness to wet processing.

EXAMPLE 4

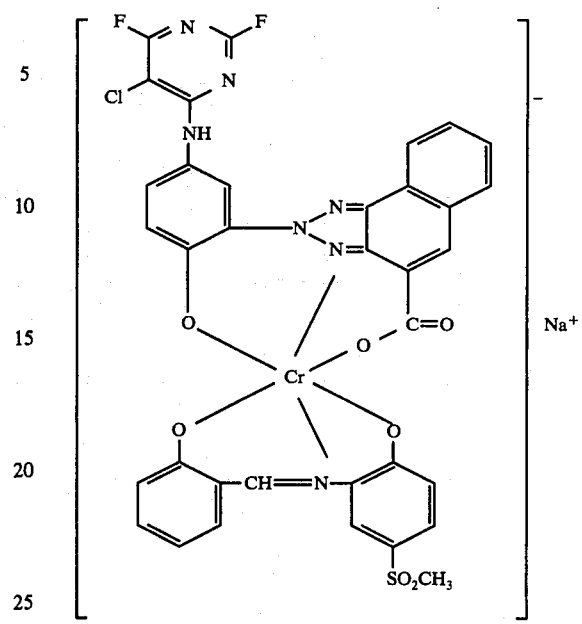

32.0 g of 2-N-(2'-hydroxy-4'-aminophenyl)-3-carboxy-naphthotriazole-[1,2], produced by oxidation and subsequent catalytic reduction of the monoazo dyestuff: 4-nitro-2-aminophenol → 2-amino-3-naphthoic acid, are dissolved in 700 ml of dioxane and 300 ml of water at 85°. To this solution are added 40 g of sodium acetate and 34.1 g of the 1:1-chromium complex compound, corresponding to 5.2 g of chromium and 29.1 g of the azomethine dyestuff, obtained by condensation of 12.2 g of salicylaldehyde with 18.7 g of 2-aminophenol-4-methylsulphone.

The thus obtained suspension is heated for 20 minutes to 85°, whereby a yellow solution is obtained which is then cooled to 12°. At this temperature are gradually added 25.0 g of 2,4,6-trifluoro-5-chloropyrimidine and stirring is maintained for 30 minutes at 12°-15°. The formed reactive dyestuff is then precipitated by pouring the solution on to 2000 ml of 20% sodium chloride solution; the dyestuff is filtered and dried. The dyestuff corresponds to the above formula. It is in the form of a yellow powder which dyes wool, from an acetic bath, in yellow shades. The yellow dyeings obtained therewith possess an excellent fastness to wet processing.

If, in the above example, instead of the given components, equivalent amounts are used of each of the triazole dyestuffs, 1:1-chromium complexes and reactive components, listed in Columns 2 to 4 of the following Table I, the procedure being otherwise the same, then reactive dyestuffs are obtained having similarly valuable properties, the shades of said dyestuffs on wool or synthetic polyamide fibres, being given in the last column of Table I.

| 1 | 2 | 3 | 4 | 5 |
|---|---|---|---|---|
| Example No. | triazole dyestuff | (1:1)-chromium complex of | reactive component | shade on cool or synthetic polyamide fibres |
| 5 | [structure: OH, COOH, N=N, NH2] | [structure: O2N, OH, N=N, NH2, SO3H] | Cl—CO—C(Br)=CH2 | green |
| 6 | " | [structure: O2N, OH, Cl, N=N, NH2, SO3H] | [cyanuric chloride structure] | " |
| 7 | " | " | [dichloropyrimidine structure] | " |
| 8 | | [structure: O2N, SO2CH3, OH, N=N, NH2, SO3H] | [structure: Cl, N, N, Cl, COCl] | " |
| 9 | " | [structure: O2N, CH3, OH, N=N, NH2, SO3H] | CH2=CH—CO—Cl | " |
| 10 | " | [structure: O2N, SO2CH3, OH, N=N, NH2, SO3H] | [structure: Cl, N, N, Cl, COCl] | " |
| 11 | " | " | Cl—CO—CH(Br)—CH2—Br | " |

EXAMPLE 12

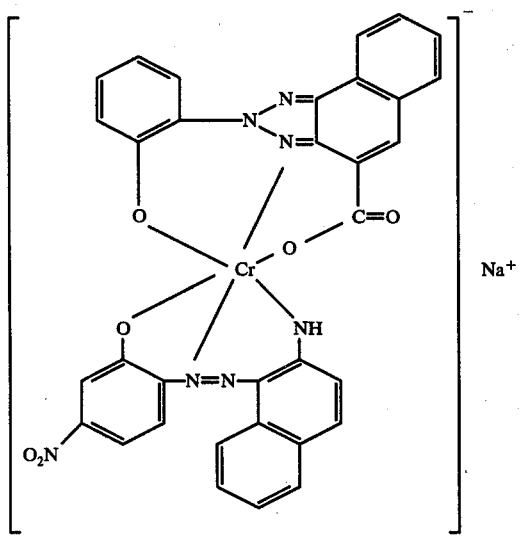

30.5 g of the triazole dyestuff, obtained by oxidation of the monoazo dyestuff: 2-aminophenol → 2-amino-3-naphthoic acid, are dissolved in 500 ml of dimethyl-sulphoxide at 80°. To this solution are added 40 g of sodium bicarbonate and 35.7 g of the 1:1-chromium complex compound, corresponding to 5.2 g of chromium and 30.7 g of the monoazo dyestuff: 5-nitro-2-aminophenol → 2-naphthylamine-1-sulphonic acid.

The mixture is heated for one hour to 80° and the formed dyestuff is then precipitated by pouring the dyestuff solution, while stirring is maintained, on to 2000 ml of 20% sodium chloride solution, whereupon the dyestuff is filtered off and dried. The dyestuff corresponds to the above formula and is in the form of a dark powder. It is particularly suitable for the production of a green printing ink.

If, in the above example, instead of the given components, equivalent amounts are used of each of the triazole dyestuffs and 1:1-chromium complexes, listed in Columns 2 and 3 of the following Table II, the procedure being otherwise the same, then dyestuffs are obtained having similarly valuable properties, the shades of which, on wool or synthetic polyamide fibres, are given in the last column of Table II.

TABLE II

| No. | Triazole dyestuff | (1:1)-Chromium complex of | Shade on wool or on synthetic polyamide fibres |
|---|---|---|---|
| 13 | 2-(2-hydroxyphenyl)-2H-naphtho[1,2-d]triazole-5-carboxylic acid | 1-[(2-hydroxy-5-chlorophenyl)azo]-2-naphthol | currant shade |
| 14 | " | 1-[(2-hydroxy-4-nitrophenyl)azo]-2-hydroxy-6-anilino-3-sulfonaphthalene | greyish blue |
| 15 | " | 1-[(2-hydroxy-4-nitrophenyl)azo]-2-hydroxy-3-sulfonaphthalene | olive |
| 16 | " | 1-[(2,5-dimethoxyphenyl)azo]-2-hydroxy-3-sulfonaphthalene | greenish-olive |
| 17 | " | 1-[(2-hydroxy-4-nitrophenyl)azo]-2-hydroxy-3-(N,N-dimethylsulfamoyl)naphthalene | olive |
| 18 | " | 1-[(2-hydroxy-5-sulfophenyl)azo]-2-hydroxy-5,8-dichloronaphthalene | currant shade |
| 19 | " | 1-[(2-hydroxy-5-methylsulfonylphenyl)azo]-2-hydroxy-5,8-dichloronaphthalene | " |

TABLE II-continued

| No. | Triazole dyestuff | (1:1)-Chromium complex of | Shade on wool or on synthetic polyamide fibres |
|---|---|---|---|
| 20 | " | [structure: 2-hydroxyphenyl with SO₂-phenyl substituent, azo-linked to 3-amino-2-carboxynaphthalene] | yellowish green |
| 21 | " | [structure: 2-hydroxy-4-nitro-5-methylsulfonylphenyl azo-linked to 3-amino-2-carboxynaphthalene] | green |
| 22 | " | [structure: 2-hydroxy-4-nitro-5-methylsulfonylphenyl azo-linked to 2-aminonaphthalene at 1-position] | " |
| 23 | " | [structure: 2-hydroxy-4-nitro-5-methylsulfonylphenyl azo-linked to 2-(ethylamino)naphthalene at 1-position] | " |
| 24 | " | [structure: 2-hydroxy-4-nitro-5-methylsulfonylphenyl azo-linked to 2-(phenylamino)naphthalene at 1-position] | " |
| 25 | [structure: 2-hydroxyphenyl-triazole fused naphthalene-carboxylic acid] | [structure: 2-hydroxybenzylidene-(2-hydroxy-4-nitrophenyl)imine] | yellow |

TABLE II-continued

| No. | Triazole dyestuff | (1:1)-Chromium complex of | Shade on wool or on synthetic polyamide fibres |
|---|---|---|---|
| 26 | " | (structure: phenyl-SO₂-NH-phenyl-N=N-naphthyl with NH₂ and SO₃H) | grey |
| 27 | " | (structure: 4-Cl-phenyl-SO₂-NH-phenyl-N=N-naphthyl with NH₂ and SO₃H) | " |
| 28 | " | (structure: phenyl-SO₂-NH-phenyl-N=CH-phenyl-OH) | yellow |
| 29 | " | (structure: CH₃O₂S-NH-phenyl-N=CH-phenyl(OH)-N=N-phenyl-SO₂NH₂) | " |
| 30 | " | (structure: 3,5-dinitro-2-hydroxyphenyl-N=N-naphthyl with NH₂) | green |
| 31 | " | (structure: 4-nitro-5-SO₂CH₃-2-hydroxyphenyl-N=N-naphthyl with NH₂ and SO₂NHC₂H₅) | " |

TABLE II-continued

| No. | Triazole dyestuff | (1:1)-Chromium complex of | Shade on wool or on synthetic polyamide fibres |
|---|---|---|---|
| 32 | [structure: 4-chloro-2-hydroxy-6-sulfo-phenyl triazole with 2-hydroxy-3-naphthoic acid] | [structure: 5-chloro-2-hydroxyphenyl azo 5,8-dichloro-1-hydroxynaphthalene] | grey |
| 33 | " | [structure: 5-chloro-2-hydroxyphenyl azo 2-hydroxynaphthalene] | currant shade |
| 34 | " | [structure: 2-carboxyphenyl azo pyrazolone with phenyl] | yellow |
| 35 | " | [structure: 4-chloro-2-carboxyphenyl azo pyrazolone with 3-chlorophenyl] | " |
| 36 | " | [structure: 2-carboxyphenyl azo pyrazolone with 4-bromophenyl] | " |
| 37 | [structure: 2-hydroxy-5-nitrophenyl triazole with 2-hydroxy-3-naphthoic acid] | [structure: 2-hydroxy-4-nitrophenyl azo 1-hydroxy-6-phenylamino-3-sulfo-naphthalene] | greenish blue |
| 38 | " | [structure: 4-sulfo-2-hydroxynaphthyl azo 2-hydroxynaphthalene] | olive |

TABLE II-continued

| No. | Triazole dyestuff | (1:1)-Chromium complex of | Shade on wool or on synthetic polyamide fibres |
|---|---|---|---|
| 39 | " | [structure: bis-naphthol azo with HO₃S and NO₂ substituents] | " |
| 40 | [structure: OH-phenyl-N=N-N=N-naphthalene-COOH with phenylazo substituent] | [structure: nitro-hydroxyphenyl azo hydroxynaphthalene sulfonic acid] | olive green |
| 41 | " | [structure: salicylaldehyde-CH=N-hydroxyphenyl-SO₂CH₃] | yellow |
| 42 | " | [structure: hydroxyphenyl-CH=N-hydroxy-nitrophenyl with sulfophenylazo substituent] | " |
| 43 | " | [structure: hydroxyphenyl-CH=N-hydroxyphenyl with phenylazo and sulfophenylazo substituents] | " |
| 44 | " | [structure: nitro-hydroxyphenyl azo hydroxynaphthalene sulfonic acid] | olive green |

TABLE II-continued

| No. | Triazole dyestuff | (1:1)-Chromium complex of | Shade on wool or on synthetic polyamide fibres |
|---|---|---|---|
| 45 | 2-(2-hydroxyphenyl)-azo-3-carboxy-naphthalene triazole structure | 2-hydroxybenzylidene-(2-hydroxy-4-nitroaniline) | reddish yellow |
| 46 | " | pyrazolone chromium complex with 2-hydroxy-4-nitrophenylazo and 3-chloroanilide | orange red |
| 47 | " | pyrazolone with 2-hydroxy-3-nitro-5-methylphenylazo and 3-sulfoanilide | red |
| 48 | 2-(2-hydroxy-5-methylsulfonylphenyl)-azo triazole-naphthalene-carboxylic acid | 2-hydroxy-5-(phenylsulfonyl)phenylazo-3-amino-2-naphthoic acid | green |
| 49 | " | 2-hydroxy-5-ethylsulfonylphenylazo-2-aminonaphthalene | green |
| 50 | " | 2-methylamino-5-methylsulfonyl-phenyl=N=CH-2-hydroxy-5-(4-chlorophenylazo)phenyl | yellow |

TABLE II-continued

| No. | Triazole dyestuff | (1:1)-Chromium complex of | Shade on wool or on synthetic polyamide fibres |
|---|---|---|---|
| 51 | " | [structure: naphthalene with OH, N=N linkage to naphthol with OH, another N=N to phenyl, and SO₃H] | greyish blue |
| 52 | " | [structure: naphthalene with OH, SO₃H, N=N to p-chlorophenyl, and N=N-C linkage to pyrazolone-type moiety with OH, N-phenyl, C=N, CH₃] | " |
| 53 | [structure: 2-hydroxy-5-methylsulfonylphenyl-N=N-triazole fused to naphthalene with COOH] | [structure: 2-hydroxy-4-nitrophenyl-N=N-naphthalene with OH, SO₃H, and NH-phenyl] | " |
| 54 | " | [structure: 2-hydroxy-4-nitrophenyl-N=N-C linkage to moiety with OH, N-(4-methylsulfonylphenyl), C=N, CH₃] | orange red |
| 55 | " | [structure: 2,5-dimethoxyphenyl-N=N-naphthalene with OH and SO₂-N(CH₃)₂] | grey |
| 56 | " | [structure: 2-hydroxy-3,5-dinitrophenyl-N=N-naphthalene with NH₂] | green |

TABLE II-continued

| No. | Triazole dyestuff | (1:1)-Chromium complex of | Shade on wool or on synthetic polyamide fibres |
|---|---|---|---|
| 57 | " | 2-hydroxy-4-nitrophenyl azo 1-hydroxy-naphthalene-3-sulphonic acid | greenish grey |
| 58 | 2-hydroxy-5-(ethylsulphonyl)phenyl–N=N–N=N– 3-carboxy-4-naphthyl (triazole) | 2-hydroxy-4-nitrophenyl azo 1-amino-naphthalene-5-sulphonic acid (8-azo) | green |
| 59 | " | 2-hydroxy-4-nitrophenyl azo 2-amino-naphthalene-6-sulphonic acid | " |
| 60 | " | 2-hydroxy-3,5-dinitrophenyl azo 2-amino-naphthalene-6-sulphonic acid | " |
| 61 | 2-hydroxy-5-chlorophenyl–N=N–N=N– 3-carboxy-4-naphthyl | 2-hydroxy-4-nitrophenyl azo 2-amino-naphthalene-6-sulphonic acid | " |
| 62 | " | 2-hydroxy-3,5-dinitrophenyl azo 2-amino-naphthalene-5-sulphonic acid | " |

TABLE II-continued

| No. | Triazole dyestuff | (1:1)-Chromium complex of | Shade on wool or on synthetic polyamide fibres |
|---|---|---|---|
| 63 | " | [3-amino-2-hydroxy-5-nitro-phenylazo → 2-amino-naphthalene-7-sulphonic acid with ortho NO₂] | " |
| 64 | 2-hydroxyphenyl-N=N-N-azo-3-carboxy-naphthalene | [2-hydroxy-4-nitrophenylazo → 1-amino-naphthalene-5-sulphonamide] | " |
| 65 | " | [2-hydroxy-4-nitrophenylazo → 1-amino-naphthalene-4-sulphonic acid] | " |
| 66 | " | [2-hydroxy-3,5-dinitrophenylazo → 1-amino-naphthalene-4-sulphonic acid] | " |
| 67 | " | [2-methylsulphonylamino-phenylazo → 2-hydroxy-4,5-dimethylbenzene] | brown |
| 68 | " | [2-hydroxy-5-(N-methylsulphamoyl)phenylazo pyrazolone-phenyl-CH₃] | orange |
| 69 | " | [2-methylsulphonylamino-phenylazo pyrazolone-phenyl-CH₃] | yellowish orange |

TABLE II-continued
| No. | Triazole dyestuff | (1:1)-Chromium complex of | Shade on wool or on synthetic polyamide fibres |
|---|---|---|---|
| 70 | " | 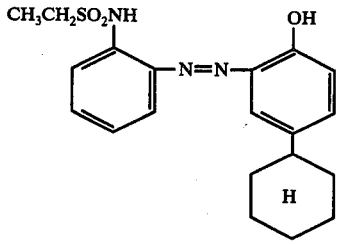 | brown |
| 71 | 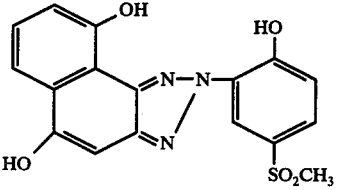 | 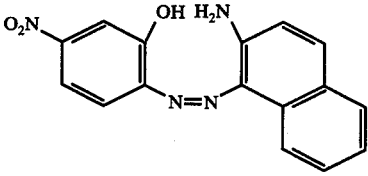 | olive green |
| 72 | 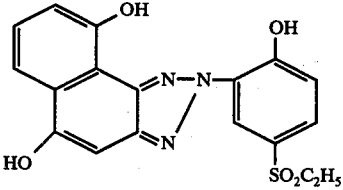 | " | " |
| 73 | 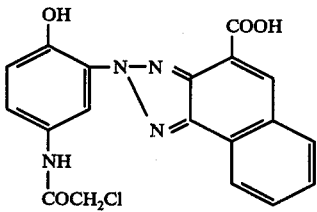 | 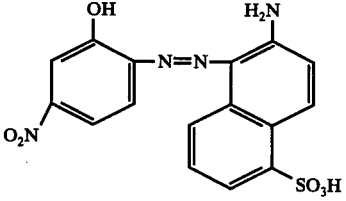 | green |
| 74 | 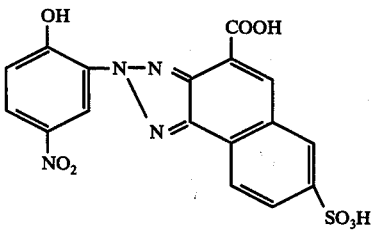 | 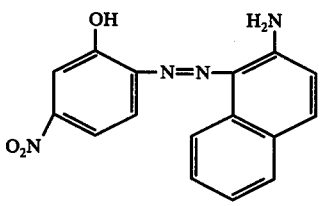 | " |
| 75 | 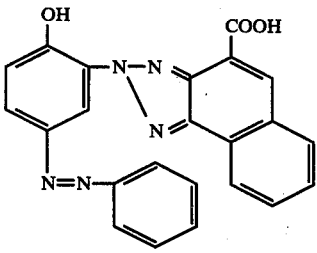 | 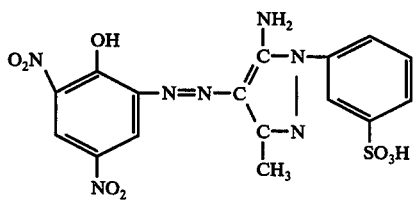 | yellowish brown |

TABLE II-continued

| No. | Triazole dyestuff | (1:1)-Chromium complex of | Shade on wool or on synthetic polyamide fibres |
|---|---|---|---|
| 76 | [4,5-dimethyl-2-hydroxyphenyl-triazolyl benzoic acid structure] | [2-hydroxy-4-nitro-5-methylsulfonyl-phenylazo-3-amino-2-naphthoic acid structure] | green |
| 77 | [2-hydroxynaphthyl-triazolyl benzoic acid structure] | " | " |
| 78 | [2-hydroxy-5-vinylsulfonyl-phenyl-triazolyl-naphthoic acid structure] | [2-hydroxy-4-nitro-5-methyl-phenylazo-amino-naphthalene sulfonic acid structure] | " |
| 79 | [2-hydroxy-5-methylsulfonyl-phenyl-triazolyl-naphthoic acid structure] | [2-hydroxy-4-nitro-5-chloro-phenylazo-amino-naphthalene structure] | " |
| 80 | " | [2-hydroxy-4-nitro-5-methylsulfonyl-phenylazo-amino-naphthalene structure] | " |
| 81 | " | [2-hydroxy-4-nitro-5-methyl-phenylazo-amino-naphthalene structure] | " |

TABLE II-continued

| No. | Triazole dyestuff | (1:1)-Chromium complex of | Shade on wool or on synthetic polyamide fibres |
|---|---|---|---|
| 82 | " | 2-hydroxy-4-nitro-5-chlorophenyl azo 2-amino-8-naphthol-5-sulfonic acid derivative (OH, O₂N, Cl on one ring; NH₂, SO₃H on naphthalene) | " |
| 83 | " | analogous isomer with SO₃H at different position | " |
| 84 | " | 2-hydroxy-4-nitro-5-methylphenyl azo naphthylamine sulfonic acid | " |
| 85 | " | isomer of 84 | " |
| 86 | " | 2-hydroxy-4-nitro-5-methylsulfonylphenyl azo aminonaphthalenesulfonic acid | " |
| 87 | " | isomer of 86 | " |

Note: Column 3 contains chemical structure diagrams showing (1:1)-chromium complexes of azo dyes with the following substituent patterns:
- 82: 2-OH, 4-NO₂, 5-Cl phenyl — azo — 2-amino-naphthalene-5-SO₃H
- 83: 2-OH, 4-NO₂, 5-Cl phenyl — azo — 2-amino-naphthalene-6-SO₃H
- 84: 2-OH, 4-NO₂, 5-CH₃ phenyl — azo — 2-amino-naphthalene-5-SO₃H
- 85: 2-OH, 4-NO₂, 5-CH₃ phenyl — azo — 2-amino-naphthalene-6-SO₃H
- 86: 2-OH, 4-NO₂, 5-SO₂CH₃ phenyl — azo — 2-amino-naphthalene-5-SO₃H
- 87: 2-OH, 4-NO₂, 5-SO₂CH₃ phenyl — azo — 2-amino-naphthalene-6-SO₃H

TABLE II-continued
| No. | Triazole dyestuff | (1:1)-Chromium complex of | Shade on wool or on synthetic polyamide fibres |
|---|---|---|---|
| 88 | " | 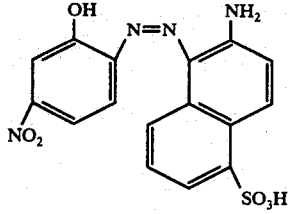 | " |
| 89 | " | 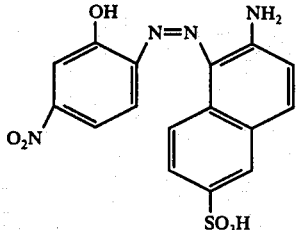 | " |
| 90 | 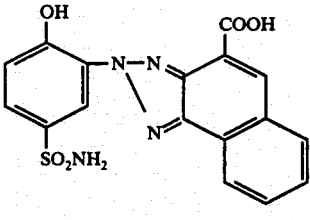 | 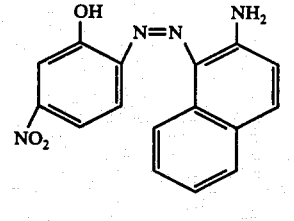 | " |
| 91 | " | 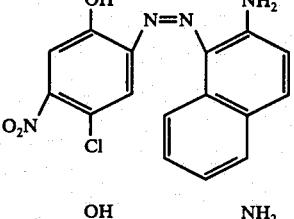 | " |
| 92 | " | 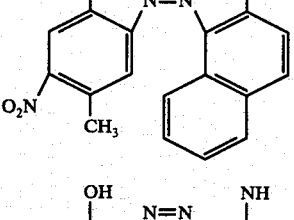 | " |
| 93 | " | 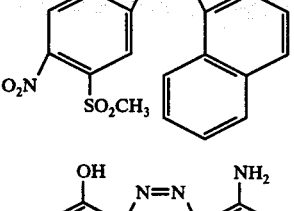 | " |
| 94 | " | 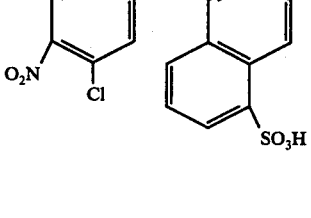 | " |

TABLE II-continued
| No. | Triazole dyestuff | (1:1)-Chromium complex of | Shade on wool or on synthetic polyamide fibres |
|---|---|---|---|
| 95 | " | 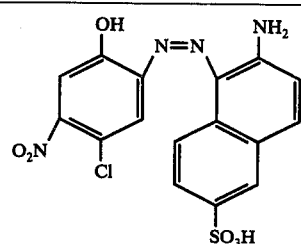 | " |
| 96 | " | 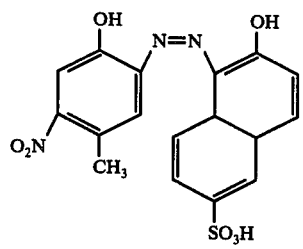 | " |
| 97 | " | 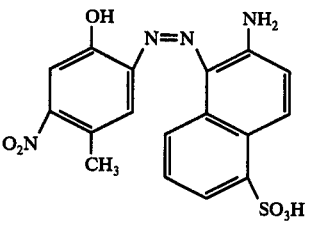 | " |
| 98 | " | 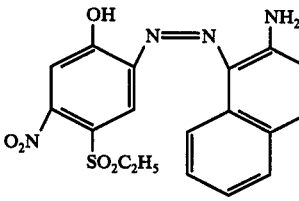 | " |
| 99 | 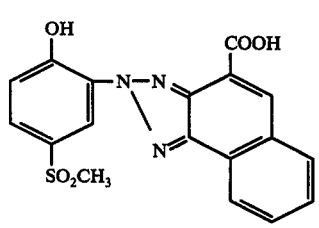 | 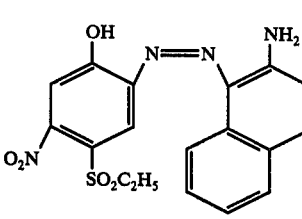 | " |
| 100 | 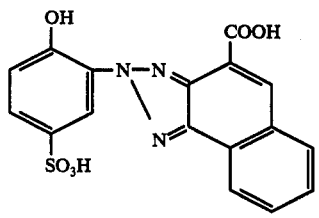 | 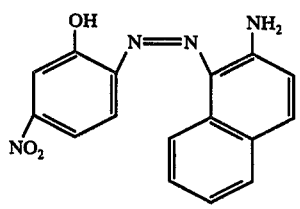 | " |

TABLE II-continued

| No. | Triazole dyestuff | (1:1)-Chromium complex of | Shade on wool or on synthetic polyamide fibres |
|---|---|---|---|
| 101 | " | 2-hydroxy-4-nitro-5-chlorophenyl azo → 2-amino-1-naphthyl | " |
| 102 | " | 2-hydroxy-4-nitro-5-methylphenyl azo → 2-amino-1-naphthyl | " |
| 103 | " | 2-hydroxy-4-nitro-5-methylsulfonylphenyl azo → 2-amino-1-naphthyl | " |
| 104 | " | 2-hydroxy-4-nitro-5-ethylsulfonylphenyl azo → 2-amino-1-naphthyl | " |
| 105 | 2-(2-hydroxy-5-nitrophenyl)-naphtho[1,2-d]triazole-3-carboxylic acid | 2-hydroxy-4-nitro-5-methylsulfonylphenyl azo → 2-amino-1-naphthyl | " |
| 106 | " | 2-hydroxy-4-nitro-5-sulfophenyl azo → 2-amino-1-naphthyl | " |
| 107 | " | 2-hydroxy-4-nitro-5-chlorophenyl azo → 2-amino-5-sulfo-1-naphthyl | " |

TABLE II-continued

| No. | Triazole dyestuff | (1:1)-Chromium complex of | Shade on wool or on synthetic polyamide fibres |
|---|---|---|---|
| 108 | " | [structure: 4-nitro-5-chloro-2-hydroxyphenyl azo coupled to 2-amino-naphthalene-5-sulfonic acid] | " |
| 109 | " | [structure: 2-hydroxy-5-sulfophenyl azo coupled to 2-amino-naphthalene] | " |
| 110 | [structure: 2-hydroxy-5-(phenylsulfonyl)phenyl azo naphthalene-3-carboxylic acid-7-sulfonic acid] | [structure: bis(2-hydroxynaphthyl) azo] | olive |
| 111 | [structure: 2-hydroxy-5-(N-ethylsulfamoyl)phenyl azo naphthalene carboxylic acid] | [structure: 4-nitro-5-(N,N-dimethylsulfamoyl)-2-hydroxyphenyl azo 2-amino-naphthalene] | green |
| 112 | [structure: 2-hydroxy-5-(N,N-dimethylsulfamoyl)phenyl azo naphthalene carboxylic acid] | [structure: 4-nitro-5-sulfamoyl-2-hydroxyphenyl azo 2-amino-naphthalene] | " |
| 113 | [structure: 2-hydroxy-5-(N-phenylsulfamoyl)phenyl azo naphthalene carboxylic acid] | [structure: 4-nitro-2-hydroxyphenyl azo 2-amino-naphthalene-6-sulfonic acid] | " |

TABLE II-continued

| No. | Triazole dyestuff | (1:1)-Chromium complex of | Shade on wool or on synthetic polyamide fibres |
|---|---|---|---|
| 114 | OH, COOH, SO₃H naphthalene-triazole | OH, NH₂, NO₂ naphthyl azo | " |
| 115 | OH, COOH, SO₂CH₃ naphthalene-triazole | OH, NH₂, NO₂, SO₃H naphthyl azo | " |
| 116 | OH, COOH, SO₂CH₃ naphthalene-triazole | OH, NH₂, O₂N, Cl, SO₃H naphthyl azo | " |

Example 117

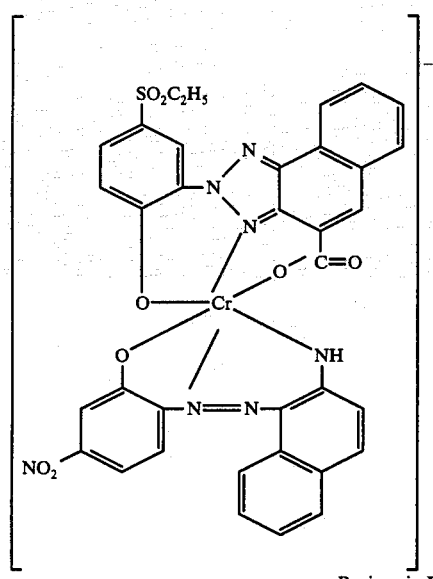

Rosinamin D-ammonium ion 20 g of the dye salt of the above formula, obtained, in a manner known per se, by precipitating the dyestuff of Example 1 with Rosinamin D (Hercules, Wilmington, Del., USA), 30 g of bleached wax-free shellac, 5 g of dibutylphthalate and 45 g of ethanol are mixed together.

A printing ink having good fastness to storing is thus obtained which is applicable as such, or diluted with ethanol, for flexographic printing on paper or aluminium sheets. On the stated materials are obtained with this printing ink, brilliant, full, green printings having fastness to light and good adhesive properties.

Example 118

2 g of the chromium complex dyestuff, obtained according to Example 1, and 3 g of ammonium sulphate are dissolved in 4000 ml of water. 100 g of prewetted wool are introduced into the dyebath at 40°–50°. The bath is heated within 30 minutes to boiling temperature and maintained boiling for 1 hour. The wool is afterwards rinsed and dried. The obtained green wool dyeing has very good fastness to wet processing and to light.

Example 119

2 g of the chromium complex dyestuff, obtained according to Example 3, as well as 2 g of ammonium sulphate and 2 g of the condensation product from 1 mole of lauryl alcohol and 15 - 20 moles of ethylene oxide are dissolved in 4000 ml of water. 100 g of Nylon 6 fabric are then introduced into the dye bath at 40°–50°, the bath is heated within 30 minutes to boiling and kept boiling for 1 hour. The fabric is afterwards rinsed with water and dried. A pure green nylon dyeing is obtained having very good fastness to light and wet processing.

Example 120

In 4000 ml of water are dissolved 4 g of the chromium complex dyestuff, obtained according to Example 3, and 100 g of well moistened wool flannel are introduced at 40°-50° into the dye bath. 3 g of 40% acetic acid are then added to the bath, the bath is heated within half an hour to boiling and it is maintained at the boiling point during ¾ hour. The dyed material is thereupon rinsed with cold water and dried. The obtained green wool dyeing has very good fastness to light and to wet processing.

By employing a dye liquor containing formic acid instead of acetic acid, wool dyeings are obtained having similarly good fastness properties.

Example 121

20 g of the chromium complex dyestuff, obtained according to Example 2, are mixed with 60 g of urea and the mixture is slurried with 50 ml of cold water. 330 ml of boiling water are poured over the mixture and to this are then added 50 g of thiodiethylene glycol, 400 g of 25% crystal gum solution, 40 g of glycerin, 10 g of 80% acetic acid as well as 30 g of a mixture of 35 parts of N-methyl-N,N-bis($\beta$-hydroxyethyl)amine salt of coconut oil fatty acid, 35 parts of lauryl alcohol pentaglycol ether and 30 parts of coconut oil fatty acid-N,N-bis-($\beta$-hydroxyethyl)amide.

The mixture is subsequently made up to 1000 g with water. Using the thus obtained paste, wool muslin is printed in the usual manner and afterwards steamed, washed and dried. A full, greenish-olive pattern is obtained which is fast to light and to wet processing.

Example 122

20 g of the chromium complex dyestuff, obtained according to Example 12, 30 g of bleached wax-free shellac, 5 g of dibutylphthalate and 45 g of ethanol are mixed together. The thus obtained printing ink exhibits good fastness to storing. It can be used directly as such, or in dilution with ethanol, for flexographic printing on paper or aluminum sheets. With this printing ink are obtained, on the stated materials, green, full printings having fastness to light and good adhesive properties.

What we claim is:

1. A chromium-containing complex dyestuff of the formula:

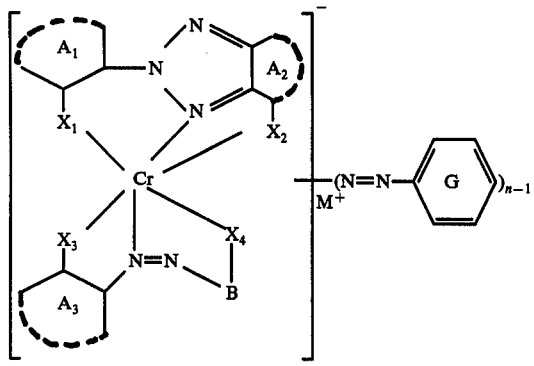

wherein $A_1$ represents o-phenylene unsubstituted or substituted by halogen, nitro, lower alkyl, lower alkylsulphonyl, phenylsulphonyl, $-SO_3^-M^+$ or

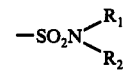

wherein $R_1$ represents hydrogen, lower alkyl and $R_2$ represents hydrogen, lower alkyl or phenyl, or by a cellulosic fiber-reactive group, or o-naphthylene unsubstituted or substituted by $-SO_3^-M^+$, $A_2$ represents unsubstituted o-phenylene or o-naphthylene unsubstituted or substituted by hydroxyl or $-SO_3^-M^+$, and $A_3$ represents o-phenylene unsubstituted or substituted by halogen, nitro, lower alkyl, lower alkoxy, lower alkylsulphonyl, phenylsulphonyl, $-SO_3^-M^+-$ or

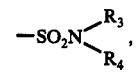

wherein $R_3$ and $R_4$ independently of each other represent hydrogen or lower alkyl, or o-naphthylene unsubstituted or substituted by nitro, $-SO_3^-M^+$, or both, B represents 1,2-naphthylene unsubstituted or substituted by halogen, phenylamino, $-COO^-M^+$, $-SO_3^-M^+$, N-lower-alkylsulphamoyl or N,N-di-lower-alkylsulphamoyl; 4-(1-phenyl-3-methyl-pyrazol-5-onyl), 4-(halogenphenyl-, 1-lower-alkyl-sulphonylphenyl- or 1-$SO_3^-M^+$-phenyl-3-methyl-pyrazol-5-onyl) or 4-(1-$SO_3^-M^+$-phenyl-3-methyl-5-amino-pyrazolyl), $M^+$ represents a colorless cation, and $n$ represents an integer from 1 to 3, and wherein ring G is unsubstituted or substituted by halogen, $-SO_3^-M^+-$ or a sulphamoyl, $X_1$ represents $-O-$, $X_2$ represents $-O-$, or $-COO-$, $X_3$ represents $-O-$, $-COO-$ or

wherein R denotes lower alkyl or phenyl, $X_4$ represents $-O-$, $-NH-$ or

wherein R has the meaning given in the definition of $X_3$, and

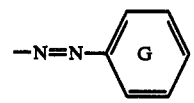

being linked to $A_1$, $A_3$ or both and the dyestuff molecule having, in all, from 0 to 3 $-SO_3^-M^+$ groups, and wherein more than one

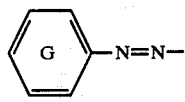

group is present it is not bound to the same ring $A_1$, $A_3$ or B and when $A_1$, $A_3$ or B are unsubstituted or substituted o-phenylene, the

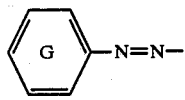

group is bound thereto in the para position with respect to the substituent participating in the chromium complex.

2. The dyestuff of claim 1 wherein the colorless cation is potassium, sodium or ammonium.

3. A chromium complex dyestuff according to claim 1 and having the formula:

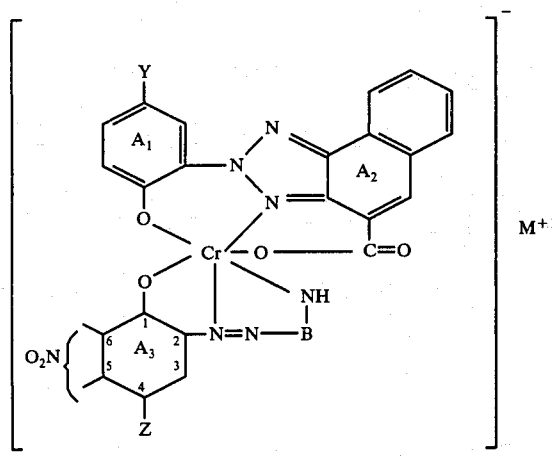

wherein

Y represents hydrogen, halogen, nitro, lower alkylsulphonyl, phenylsulphonyl, $-SO_3^-M^+$,

wherein $R_1$ represents hydrogen or lower alkyl and $R_2$ represents hydrogen, lower alkyl, phenyl, or

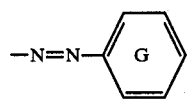

wherein ring G can be unsubstituted or substituted by halogen, $-SO_3^-M^+-$ or a sulphamoyl, Z represents chloro, nitro, lower alkyl, lower-alkyl-sulphonyl or $-SO_3^-M^+$, and, when $A_3$ is unsubstituted in 6-position, also hydrogen, B represents 1,2-naphthylene, and M+ represents a colorless cation, and wherein $A_2$, B, or both, can be unsubstituted or substituted by $-SO_3^-M^+$ and the dyestuff molecule contains, in all, from 0 to 2 $-SO_3^-M^+$.

4. The dyestuff of claim 3 wherein the colorless cation is potassium, sodium or ammonium.

5. Chromium containing complex dyestuff as claimed in claim 3, of the formula

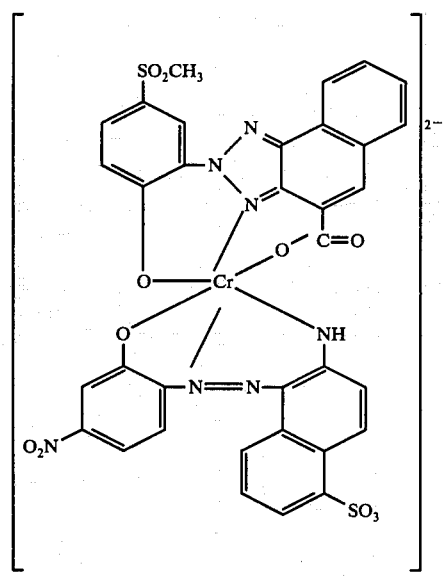

wherein M+ represents the sodium, potassium or ammonium ion.

6. Chromium-containing complex dyestuff as claimed in claim 3, of the formula

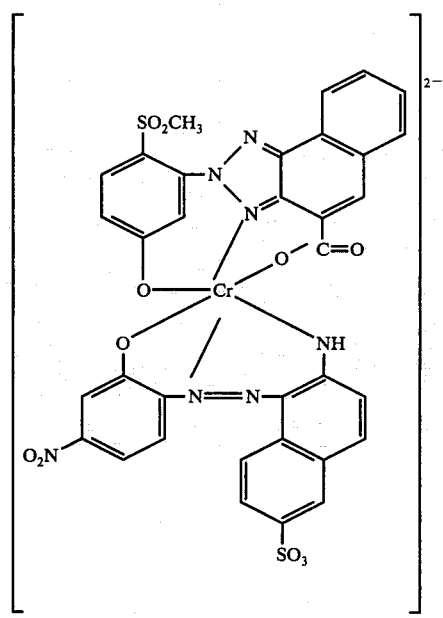

wherein M+ represents the sodium, potassium or ammonium ion.

7. Chromium-containing complex dyestuff as claimed in claim 3, of the formula

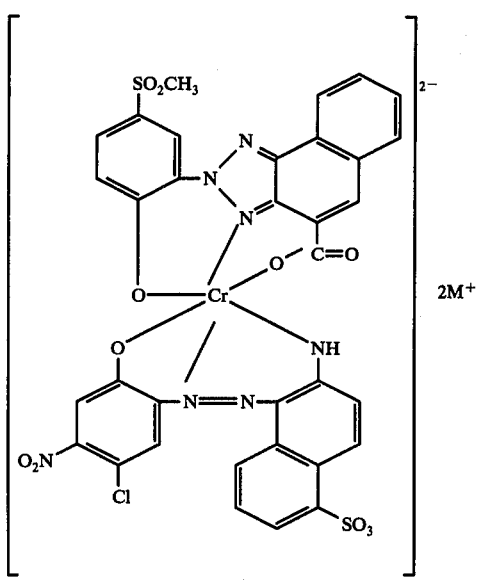
wherein M+ represents the sodium, potassium or ammonium ion.
8. Chromium-containing complex dyestuff as claimed in claim 3, of the formula
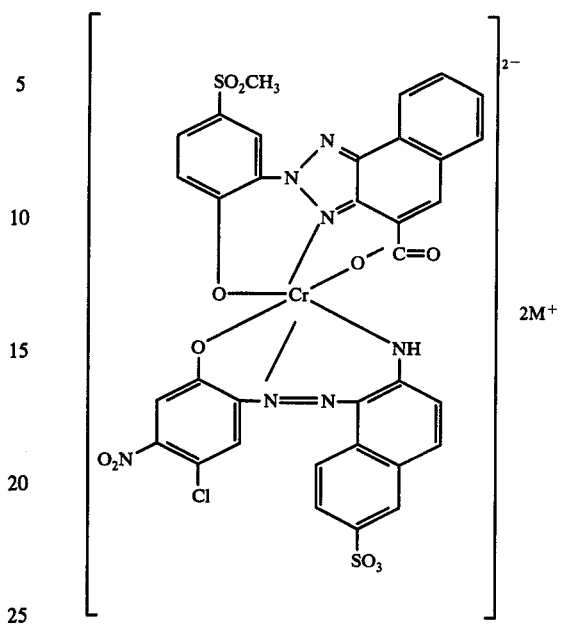
wherein M+ represents the sodium, potassium or ammonium ion.
9. Chromium-containing complex dyestuff as claimed in claim 3, of the formula
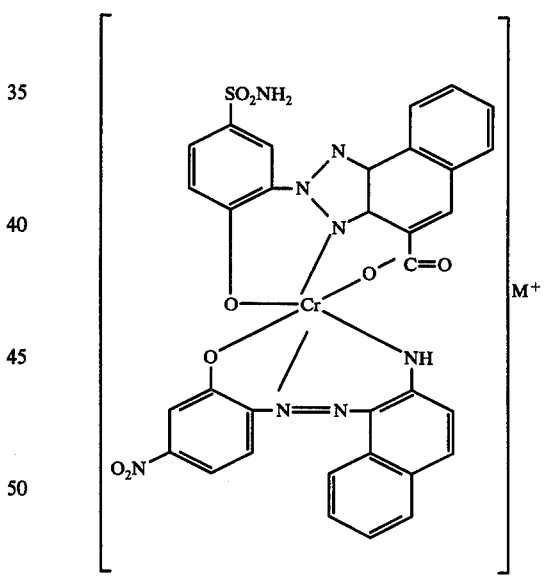
wherein M+ represents the sodium, potassium or ammonium ion.
* * * * *